3,096,298
PREPARATION OF POLYVINYL ALCOHOL FROM POLYVINYL ACETATE AND AQUEOUS SOLUTION THEREOF
Kozo Fujii and Yasuji Oyanagi, Kurashiki City, Japan, assignors to Kurashiki Rayon Co., Ltd., Okayama Prefecture, Japan, a corporation of Japan
No Drawing. Filed Mar. 26, 1959, Ser. No. 802,006
4 Claims. (Cl. 260—29.6)

The present invention relates to a process for the production of stable polyvinyl alcohol. More particularly, the invention relates to the production of polyvinyl alcohol solutions which are stable upon standing.

The production of polyvinyl alcohol is well-know in the art. Polyvinyl alcohol products may be dissolved in hot water to form viscous solutions which have considerable utility as paste materials, adhesives, or as spinning solutions for the production of filaments. Prior solutions of polyvinyl alcohol have the disadvantage that they are unstable at normal temperatures upon standing. When such solutions are left to stand exposed to air, the viscosity of the solutions gradually increases until finally the solutions lose fluidity and gel. In order to avoid such viscosity change, various expedients have been tried including maintaining the solutions constantly at temperatures above 80° C., by effecting only partial saponification of the polyvinyl acetate instead of complete saponification, or by converting the polyvinyl alcohol into derivatives thereof by various reactions.

It is an object of the present invention to provide an improved process for the production of stable polyvinyl alcohol.

It is a further object of the present invention to provide polyvinyl alcohol solutions which are stable upon standing.

Other objects will be apparent from the following description of the invention.

In accordance with the present invention, stable polyvinyl alcohol solutions are formed by polymerizing a vinyl ester such as vinyl acetate at a temperature of at least 135° C. to form polymeric vinyl ester. The polymeric vinyl ester, e.g., polyvinyl acetate, is then saponified to produce product polyvinyl alcohol. This polyvinyl alcohol can be dissolved in water to form aqeous solutions having outstanding stability as contrasted with polyvinyl alcohol solutions prepared by previously known techniques.

The following illustrates the advantageous effects obtained through practice of this invention. Various samples of vinyl acetate were polymerized at different temperatures. The resulting polymeric vinyl acetate products were saponified by alkaline catalyzed alcoholysis to form polyvinyl alcohol. Each of the resulting polyvinyl alcohol samples was dissolved in water to form a solution of 16.4% polyvinyl alcohol by weight. These solutions were allowed to stand and the change of viscosity upon standing was measured. If the viscosity of the polyvinyl alcohol solution initially is $\eta_0$ and the viscosity upon standing for $t$ hours is $\eta_t$ the constant $\alpha$ can be calculated according to the equation $$\eta_t = \eta_0(1+\alpha t)$$

The constant $\alpha$ is independent of the degree of polymerization of the polyvinyl alcohol and when comparing polyvinyl alcohol solutions of the same concentration it can be used as a measure of the solution stability. The following table shows the constant $\alpha$ for the polyvinyl alcohol solutions as well as the temperature at which the polyvinyl acetate was polymerized.

TABLE 1

| Temperature of polymerization, ° C. | 60 | 100 | 120 | 140 | 160 |
|---|---|---|---|---|---|
| $\alpha 10^{-3}$ (hour$^{-1}$) | 15.9 | 5.8 | 3.6 | 2.2 | 1.6 |

As shown from Table 1, improved solutions which have more stable viscosity characteristics upon standing are obtained from polyvinyl acetate polymerized at higher temperatures. From a practical standpoint values of $\alpha$ less than $3 \times 10^{-3}$ are preferable. In accordance with the present invention polyvinyl alcohol prepared from vinyl esters polymerized at temperatures of at least 135° C. are employed.

In carrying out the invention, it is practically impossible to carry out the polymerization by emulsifying techniques at temperatures above 135° C. Additionally, except in the case where very small amounts of solvent are employed, polymers having a suitably high degree of polymerization cannot be obtained practically by ordinary solution polymerization techniques at temperatures greater than 135° C. Accordingly, in carrying out the present invention whereupon a vinyl ester is polymerized at a temperature of 135° C. or above, bulk polymerizations are used. Minor amounts of solvents can be used.

Vinyl acetate is the preferred vinyl ester which is polymerized and then saponified to form polyvinyl alcohol in accordance with the invention. However, other vinyl esters such as vinyl formate can be used. The polymerizations are carried out in accordance with known techniques. Preferably a free radical polymerization initiator such as benzoylperoxide, lauroylperoxide, $\alpha,\alpha'$-azobisisobutyronitrile, and the like is used. Heating may also be employed to carry out the polymerization.

In order to attain the necessary polymerization temperature of at least 135° C., the polymerization reaction is usually conducted under elevated pressure.

The polymeric vinyl ester obtained as above described is saponified in accordance with known methods to produce polyvinyl alcohol. A particularly preferred saponification technique involves alkaline catalyzed alcoholysis of the polymeric vinyl ester. Suitable alkaline catalysts include sodium hydroxide, sodium methylate, potassium methylate, and the like. Suitable alcohols include methanol, ethanol, and the like.

Polyvinyl alcohol obtained in accordance with the present invention can be dissolved in water to form aqueous solutions which have outstanding viscosity stability.

The following examples illustrate the invention:

*Example 1*

About 15 grams of vinyl acetate together with a small amount of methanol were sealed in a capsule which had a volume of about 25 cc. This capsule was heated in an autoclave at 140° C. for 10 hours to effect polymerization of the vinyl acetate. The resulting polyvinyl acetate was purified by precipitation, and was subjected to alkaline catalyzed alcoholysis to obtain completely saponified polyvinyl alcohol. After removing impurities by washing with methanol, the polyvinyl alcohol was dried under reduced pressure at 65° C. for 24 hours. This resulting polyvinyl alcohol was dissolved in water at 100° C. to form solutions of various concentrations. The change in viscosities of these solutions upon standing at 30° C. are presented in Table 2 in comparison with the change of viscosities of polyvinyl alcohol prepared by conventional techniques.

Example 2

15 grams of vinyl acetate containing 0.005% by weight lauroylperoxide was polymerized similarly as described in Example 1 at 160° C. for 3 hours. Polyvinyl alcohol was prepared therefrom as described in Example 1 and aqueous solutions of the polyvinyl alcohol were prepared and tested as described in Example 1.

TABLE 2

| Polymerization Temp. (° C.) | Monomer Conversion (percent) | Degree of polymerization | PVA concentration (wt. percent) | Initial Viscosity (Poise) | Time left until the solution has twice the initial viscosity (hours) |
|---|---|---|---|---|---|
| 60 | 29.6 | 1,265 | 19.5 | 140 | about 8 hours. |
|    |      |       | 18.2 | 93  | about 12 hours. |
|    |      |       | 16.4 | 54  | about 19 hours. |
| 60 | 31.4 | 720   | 19.5 | 19  | about 8 hours. |
|    |      |       | 18.2 | 14  | about 12 hours. |
|    |      |       | 16.4 | 9.5 | about 19 hours. |
| 140 | 27.2 | 1,121 | 19.5 | 58  | about 9 days. |
|    |      |       | 18.2 | 38  | about 13 days. |
|    |      |       | 16.4 | 23  | about 20 days. |
| 160 | 37.6 | 811   | 19.5 | 24  | about 12 days. |
|    |      |       | 18.2 | 17  | about 17 days. |
|    |      |       | 16.4 | 12  | about 27 days. |

The results presented above clearly show the superior stabilities of polyvinyl alcohol solutions prepared in accordance with the present invention.

We claim:

1. A process for preparing polyvinyl alcohol which comprises homopolymerizing vinyl acetate in bulk in the presence of a polymerization initiator consisting essentially of a compound selected from the group consisting of the organic peroxides and azobis(isobutyronitrile) at a temperature of at least 135° C. and superatmospheric pressure to form homopolymeric polyvinyl acetate, and saponifying the polyvinyl acetate to form polyvinyl alcohol.

2. A process according to claim 1 wherein said vinyl acetate is polymerized in the presence of a small amount of methanol.

3. A process according to claim 1 wherein said vinyl acetate is polymerized at a temperature of 135° to 160° C.

4. An aqueous solution of polyvinyl alcohol prepared by the process of claim 1.

References Cited in the file of this patent

UNITED STATES PATENTS

| | | |
|---|---|---|
| 2,108,857 | Hopff et al. | Feb. 22, 1938 |
| 2,127,135 | Plauson | Aug. 16, 1938 |
| 2,467,774 | Plambeck | Apr. 19, 1949 |
| 2,485,796 | White | Oct. 25, 1949 |
| 2,662,878 | Bryant | Dec. 15, 1953 |
| 2,913,439 | Bondi et al. | Nov. 17, 1959 |

FOREIGN PATENTS

| | | |
|---|---|---|
| 819,291 | Great Britain | Sept. 2, 1959 |
| 202,655 | Australia | July 19, 1956 |